(12) United States Patent
Sakamaki

(10) Patent No.: US 11,954,550 B2
(45) Date of Patent: Apr. 9, 2024

(54) CARD READER

(71) Applicant: NIDEC SANKYO CORPORATION, Nagano (JP)

(72) Inventor: Hirotaka Sakamaki, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 311 days.

(21) Appl. No.: 17/616,666

(22) PCT Filed: Jun. 4, 2020

(86) PCT No.: PCT/JP2020/022030
§ 371 (c)(1),
(2) Date: Dec. 5, 2021

(87) PCT Pub. No.: WO2020/246525
PCT Pub. Date: Dec. 10, 2020

(65) Prior Publication Data
US 2022/0335232 A1    Oct. 20, 2022

(30) Foreign Application Priority Data
Jun. 6, 2019    (JP) .................................. 2019-105921

(51) Int. Cl.
*G06K 7/08*    (2006.01)
(52) U.S. Cl.
CPC .................................. *G06K 7/087* (2013.01)
(58) Field of Classification Search
CPC ........ G06K 7/087; G06K 7/0008; G06K 7/08; G06K 13/06; G11B 5/02
USPC ........................................................ 235/449
See application file for complete search history.

(56) References Cited

U.S. PATENT DOCUMENTS

| 2012/0280041 A1 | 11/2012 | Ross et al. |
| 2017/0018135 A1 | 1/2017 | Sakamaki et al. |

FOREIGN PATENT DOCUMENTS

| JP | 2012234535 | 11/2012 |
| JP | 2019053648 | 4/2019 |
| WO | 2015133567 | 9/2015 |

OTHER PUBLICATIONS

"International Search Report (Form PCT/ISA/210) of PCT/JP2020/022030", dated Nov. 8, 2020, with English translation thereof, pp. 1-4.

*Primary Examiner* — Thien M Le
*Assistant Examiner* — Tae W Kim
(74) *Attorney, Agent, or Firm* — JCIPRNET

(57) ABSTRACT

In a card reader, an interfering magnetic field generation mechanism 11 includes a core part 14a, a core part 14b, and a core part 15a, each of which is formed of soft magnetic material in a straight line, a coil 16 that is wound around the core part 14a, a coil 17 that is connected to the coil 16 in series and is wound around the core part 14b, a coil 18 that is wound around the core part 15a, a first drive circuit that supplies alternating current to the coils 16 and 17, and a second drive circuit that supplies alternating current to the coil 18. The core part 15a is disposed between the core part 14a and the core part 14b. The core part 15a is formed independently of the core parts 14a and 14b, and is separated from the core parts 14a and 14b.

13 Claims, 4 Drawing Sheets

CARD READER

CROSS-REFERENCE TO RELATED APPLICATION

This application is a 371 application of the International PCT application serial no. PCT/JP2020/022030, filed on Jun. 4, 2020, which claims the priority benefits of Japan Patent Application No. 2019-105921, filed on Jun. 6, 2019. The entirety of each of the above-mentioned patent applications is hereby incorporated by reference herein and made a part of this specification.

TECHNICAL FIELD

The present disclosure relates to a card reader that performs reading of magnetic data recorded on a card and recording of magnetic data to a card.

BACKGROUND ART

Conventionally, there has been known a card reader capable of defeating so-called skimming in which a criminal attaches a magnetic head to a card insertion part of the card reader to illegally acquire magnetic data of a card by the magnetic head (see, for example, Patent Literature 1). The card reader disclosed in Patent Literature 1 has an interfering magnetic field generation mechanism which generates an interfering magnetic field to defeat reading of magnetic data by a magnetic head for skimming (hereinafter referred to as a "skimming magnetic head"). The interfering magnetic field generation mechanism includes a core formed of soft magnetic material and four excitation coils wound around the core.

In the card reader disclosed in Patent Literature 1, the core and coils are disposed above a card movement path along which a card moves. The core is composed of a first core part, a second core part, a third core part, and a fourth core part, each of which has a rod-like shape and is disposed so that its longitudinal direction coincides with the front-rear direction, and a rod-like connecting core part which interconnects the first through fourth core parts at their rear ends. Thus, the first core part, the second core part, the third core part, and the fourth core part are integrated. The first through fourth core parts are arranged in this order in the left-right direction. The coils are respectively wound around the first through fourth core parts.

A first coil that is a coil wound around the first core part and a third coil that is a coil wound around the third core part are connected in series, while a second coil that is a coil wound around the second core part and a fourth coil that is a coil wound around the fourth core part are connected in series. When the first coil and the third coil are supplied with alternating current, an AC magnetic field is generated in which the direction of the magnetic lines of force fluctuates between a direction from the front end face of the first core part to the front end face of the third core part and a direction from the front end face of the third core part to the front end face of the first core part. Furthermore, when the second coil and the fourth coil are supplied with alternating current, an AC magnetic field is generated in which the direction of the magnetic lines of force fluctuates between a direction from the front end face of the second core part to the front end face of the fourth core part and a direction from the front end face of the fourth core part to the front end face of the second core part.

In the card reader disclosed in Patent Literature 1, the interfering magnetic field generation mechanism is separately provided with a drive circuit for supplying alternating current to the first and third coils and a drive circuit for supplying alternating current to the second and fourth coils. The alternating current supplied to the first and third coils and the alternating current supplied to the second and fourth coils are different in frequency and amplitude. Therefore, the card reader disclosed in Patent Literature 1 is capable of allowing the interfering magnetic field generation mechanism to generate a complex interfering magnetic field, which enables to effectively prevent unauthorized reading of magnetic data by a skimming magnetic head.

CITATION LIST

Patent Literature

Japanese Unexamined Patent Application Publication No. 2019-53648

SUMMARY OF THE INVENTION

Problems to be Solved by the Invention

The inventor of the present application has made research to expand the influence range of the interfering magnetic field generated by the interfering magnetic field generation mechanism in order to make it possible to prevent skimming even when the skimming magnetic head is attached at a position distant to the insertion slot of the card. In the card reader disclosed in Patent Literature 1, the first through fourth core parts are interconnected at their rear ends, so that a magnetic path is likely to be formed among the first, second, third and fourth core parts.

Therefore, the card reader disclosed in Patent Literature 1 is likely to generate magnetic flux which enters the front end face of the first core part or the front end face of the third core part from the front end face of the second core part disposed between the first core part and the third core part, and magnetic flux which enters the front end face of the second core part from the front end face of the first core part or the front end face of the third core part. Furthermore, the card reader is likely to generate magnetic flux which enters the front end face of the second core part or the front end face of the fourth core part from the front end face of the third core part disposed between the second core part and the fourth core part, and magnetic flux which enters the front end face of the third core part from the front end face of the second core part or the front end face of the fourth core part. The research of the inventor of the present application has revealed that the card reader disclosed in Patent Literature 1 is likely to generate such magnetic flux, so that it is difficult for the card reader to expand the influence range of the interfering magnetic field generated by the interfering magnetic field generation mechanism.

An object of the present disclosure is accordingly to provide a card reader including an interfering magnetic field generation mechanism for generating a magnetic field to defeat unauthorized reading of magnetic data recorded on a magnetic stripe of a card, in which the card reader is capable of expanding the influence range of the interfering magnetic field generated by the interfering magnetic field generation mechanism, even though the interfering magnetic field generation mechanism is capable of generating a complicated interfering magnetic field.

Means for Solving the Problem

To solve the problem described above, a card reader according to an aspect of the present disclosure includes a card insertion slot through which a card having a magnetic stripe is inserted, a card movement path along which the card inserted through the card insertion slot moves, and an interfering magnetic field generation mechanism that generates a magnetic field for defeating unauthorized reading of magnetic data recorded on the magnetic stripe. The interfering magnetic field generation mechanism includes a first core part, a second core part, and a third core part, each of which is formed of soft magnetic material in a straight line, a first coil that is a coil wound around the first core part, a second coil that is a coil wound around the second core part and being connected with the first coil in series, a third coil that is a coil wound around the third core part, a first drive circuit that supplies alternating current to the first coil and the second coil, and a second drive circuit that supplies alternating current to the third coil. The first core part, the second core part, and the third core part are disposed on one side relative to the card movement path in a thickness direction of the card that moves along the card movement path and to the third core part is disposed between the first core part and the second core part, when viewed in the thickness direction of the card. When alternating current is supplied to the first coil and the second coil, an AC magnetic field is generated in which a direction of magnetic lines of force fluctuates between: a direction from a first end face that is one end face of the first core part to a second end face that is one end face of the second core part, and a direction from the second end face to the first end face. The third core part is formed independently of the first core part and the second core part, and is separated from the first core part and the second core part.

In the card reader of the present aspect, the interfering magnetic field generation mechanism includes a first drive circuit that supplies alternating current to the first coil and the second coil, and a second drive circuit that supplies alternating current to the third coil. Therefore, according to the present aspect, it becomes possible to make alternating current supplied to the first and second coils and alternating current supplied to the third coil different in frequency and amplitude. Consequently, according to the present aspect, it becomes possible to allow the interfering magnetic field generation mechanism to generate a complex interfering magnetic field.

Furthermore, according to the present aspect, the third core part is formed independently of the first core part and the second core part, and is separated from the first core part and the second core part. That is, according to the present aspect, the third core part is not in connection with the first core part and the second core part. Therefore, according to the present aspect, a magnetic path is less likely to be formed between the first and second core parts and the third core part. Consequently, according to the present aspect, the magnetic flux which enters the first core part or the second core part from the third core part disposed between the first core part and the second core part, and the magnetic flux which enters the third core part from the first core part or the second core part are less likely to be generated. As a result, according to the present aspect, it becomes possible to expand the influence range of the interfering magnetic field generated by the interfering magnetic field generation mechanism. Thus, according to the present aspect, it becomes possible to expand the influence range of the interfering magnetic field generated by the interfering magnetic field generation mechanism, even though the interfering magnetic field generation mechanism is capable of generating a complicated interfering magnetic field.

According to an aspect of the present disclosure, the interfering magnetic field generation mechanism includes a first core having a connecting core part that connects the first core part and the second core part, the first core part, and the second core part, and a second core having the third core part, the first core and the second core being formed independently of one another. In this case, the first core part and the second core part are connected by the connecting core part, so that it becomes possible to suppress magnetic flux leakage between the first core part and the second core part. Consequently, it becomes possible to increase the intensity of the interfering magnetic field generated by the first core part and the second core part.

Furthermore, according to an aspect of the present disclosure, the interfering magnetic field generation mechanism may include a first core having the first core part, a second core having the second core part, and a third core having the third core part, and the first core, the second core, and the third core may be formed independently of one another.

According to an aspect of the present disclosure, taking a direction orthogonal to a movement direction of the card that moves along the card movement path and to the thickness direction of the card to be a width direction of the card, a longitudinal direction of the first core part formed in a straight line, a longitudinal direction of the second core part formed in a straight line, and a longitudinal direction of the third core part formed in a straight line are substantially parallel to the movement direction of the card, when viewed, for example, in the thickness direction of the card, and the third core part is disposed between the first core part and the second core part in the width direction of the card. In this case, it becomes possible to expand the influence range of the interfering magnetic field generated by the interfering magnetic field generation mechanism to a farther position in front of the card reader, compared with the case in which the longitudinal directions of the first core part, the longitudinal directions of the second core part, and the longitudinal direction of the third core part are inclined with respect to the front-rear direction when viewed in the thickness direction of the card.

According to an aspect of the present disclosure, the third core part is preferably different from the first core part and the second core part in length. With this configuration, it becomes possible to place one end of the third core part farther from one end of the first core part and one end of the second core part, or to place the opposite ends of the third core part farther from the opposite ends of the first core part and the opposite ends of the second core part. Consequently, the magnetic flux that enters the first core part or the second core part from the third core part, and the magnetic flux that enters the third core part from the first core part or the second core part are less likely to be generated.

According to an aspect of the present disclosure, for example, the third core part is greater than the first core part and the second core part in length. In this case, it becomes possible to increase the number of turns in the third coil wound around the third core part. Consequently, it becomes possible to increase the intensity of the interfering magnetic field generated by the third core part.

According to an aspect of the present disclosure, taking a direction orthogonal to a movement direction of the card that moves along the card movement path and to the thickness direction of the card to be a width direction of the card, an inclination angle of the third core part with respect to the movement direction of the card is preferably different from an inclination angle of the first core part and an inclination angle of the second core part with respect to the movement direction of the card, when viewed in the width direction of the card. With this configuration, it becomes possible to place one end of the third core part farther from one end of the first core part and one end of the second core part, or to place the opposite ends of the third core part farther from the opposite ends of the first core part and the opposite ends of the second core part. Consequently, the magnetic flux that enters the first core part or the second core part from the third core part, and the magnetic flux that enters the third core part from the first core part or the second core part are less likely to be generated.

According to an aspect of the present disclosure, the inclination angle of the third core part with respect to the movement direction of the card is greater than the inclination angle of the first core part and the inclination angle of the second core part with respect to the movement direction of the card, when viewed in the width direction of the card.

Effect of the Invention

As described above, according to the present disclosure, it becomes possible for a card reader, which includes an interfering magnetic field generation mechanism that generates a magnetic field for defeating unauthorized reading of magnetic data recorded on a magnetic stripe of a card, to expand the influence range of the interfering magnetic field generated by the interfering magnetic field generation mechanism, even though the interfering magnetic field generation mechanism is capable of generating a complicated interfering magnetic field.

MODE FOR CARRYING OUT THE INVENTION

In the following, embodiments of the present disclosure will be described with reference to the drawings.

Schematic Configuration of Card Reader

Figure 1:
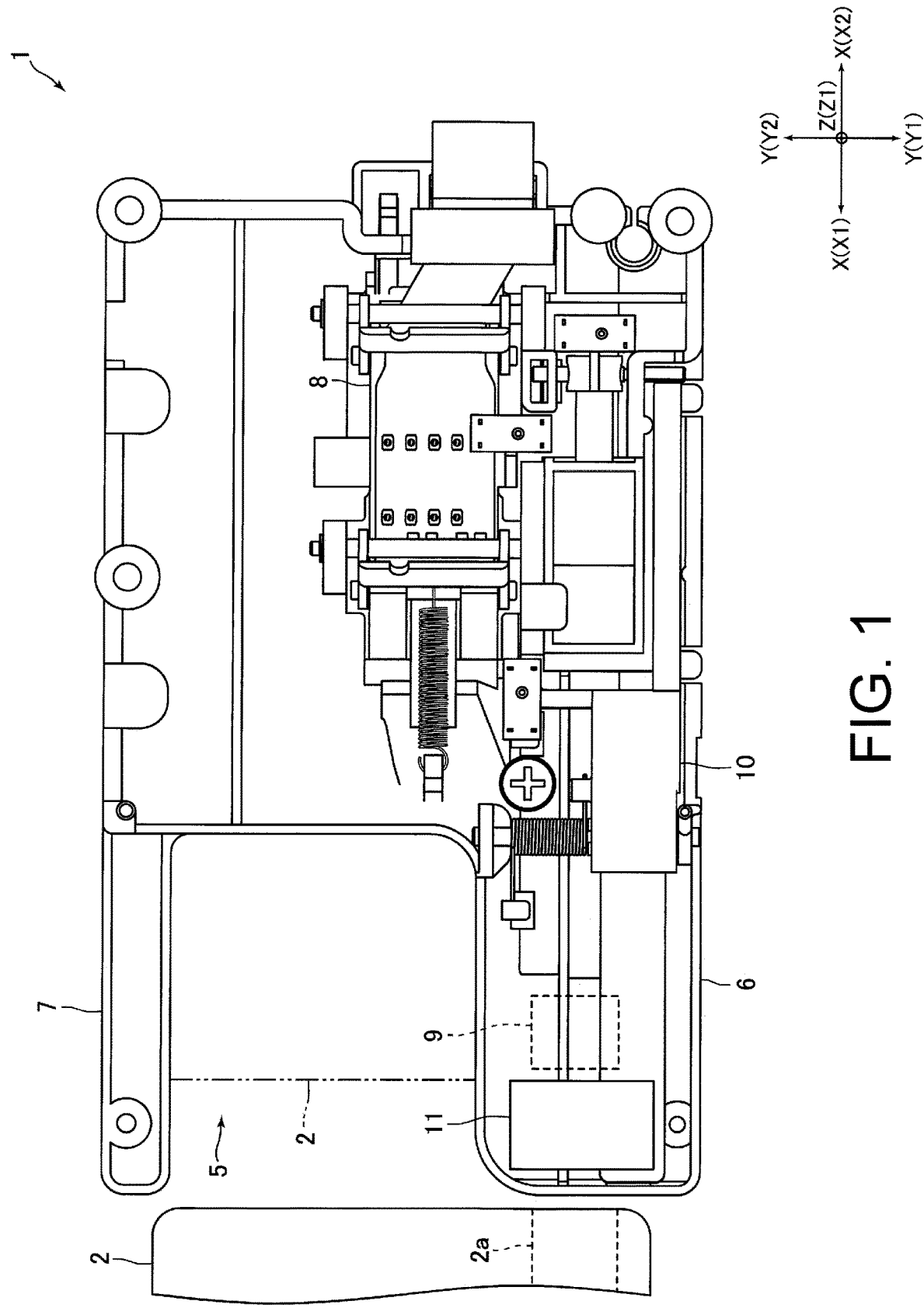
FIG. 1 is a plan view for explaining a configuration of a card reader according to an embodiment of the present disclosure.
Figure 2:
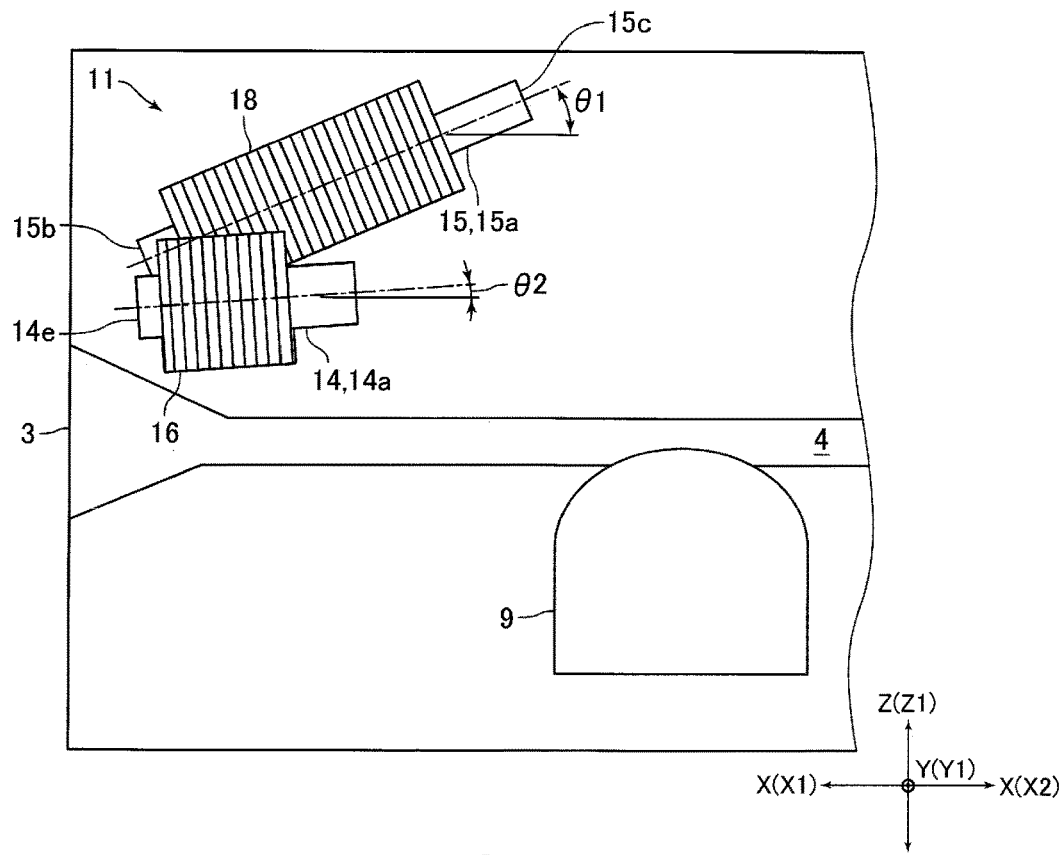
FIG. 2 is a side view for explaining a configuration of the front end of the card reader illustrated in FIG. 1.

FIG. 1 is a plan view for explaining a configuration of a card reader 1 according to an embodiment of the present disclosure. FIG. 2 is a side view for explaining a configuration of the front end of the card reader 1 illustrated in FIG. 1.

The card reader 1 of the present embodiment is a device for a user to manually operate a card 2 to perform at least one of reading data recorded on the card 2 or recording data to the card 2. Specifically, the card reader 1 is a so-called dip type card reader that reads and records data by manual insertion of the card 2 to the card reader 1 and manual withdrawal of the card 2 from the card reader 1. The card reader 1 is mounted on a predetermined host device (not illustrated) for use.

The card reader 1 provided with a card insertion slot 3 through which the card 2 is inserted, and a card movement path 4 along which the card 2 inserted from the card insertion slot 3 moves. The card 2 moves in a straight line along the card movement path 4. In the following description, the X-direction in FIG. 1 and the like, which is the movement direction of the card 2 moving along the card movement path 4, is taken to be a front-rear direction. Furthermore, the Z-direction in FIG. 1 and the like, which is the thickness direction of the card 2 moving along the card movement path 4, is taken to be a top-bottom direction, while the Y-direction in FIG. 1 and the like, which is the width direction of the card 2 orthogonal to the card 2 movement direction (front-rear direction) and the card 2 thickness direction (top-bottom direction), is taken to be a left-right direction.

Regarding the front-rear direction, the X1 direction side in FIG. 1 and the like, to which the card 2 is withdrawn from the card insertion slot 3, is taken to be a "front" side, while the X2 direction side in FIG. 1 and the like, to which the card 2 is inserted in the card insertion slot 3, is taken to be a "rear" side. Furthermore, the Z1 direction side in FIG. 2 and the like, which is one direction side relative to the top-bottom direction, is taken to be an "upper" side, while the Z2 direction side in FIG. 2 and the like, which is the opposite direction side in the top-bottom direction, is taken to be a "lower" side. The Y1 direction side in FIG. 1 and the like, which is one direction side relative to the left-right direction, is taken to be a "right" side, while the Y2 direction side in FIG. 1 and the like, which is the opposite direction side in the left-right direction, is taken to be a "left" side.

The card 2 is, for example, a generally rectangular shaped vinyl chloride card having a thickness of approximately 0.7 to 0.8 mm. A magnetic stripe 2a on which magnetic data is recorded is formed on the back surface of the card 2. The magnetic stripe 2a is formed in an elongated strip shape along the longitudinal direction of the card 2 which is formed in a generally rectangular shape. An IC chip is incorporated in the card 2, and an external connection terminal for the IC chip is formed on the front surface of the card 2. Furthermore, an antenna for communication may be incorporated in the card 2. The card 2 may be a polyethylene terephthalate (PET) card having a thickness of approximately 0.18 to 0.36 mm, a paper card having a predetermined thickness, or the like.

The card 2 is inserted to the card reader 1 with the back surface of the card 2 facing downward, and moves along the card movement path 4. Furthermore, the card 2 is inserted to the card reader 1 with the longitudinal direction of the card 2 being substantially coincide with the front-rear direction, and moves along the card movement path 4. The card movement path 4 is formed in such a way that its shape when viewed in the left-right direction is a straight line. The front end of the card movement path 4 is the card insertion slot 3.

A cutout 5 is cut at a part of the front end side of the card reader 1 so as to allow insertion of the card 2 and withdrawal of the card 2 by a user. The cutout 5 is formed so that the cutout is cut from the front end of the frame of the card reader 1 toward the rear side. Furthermore, when viewed in the left-right direction, the cutout 5 is formed at an intermediate portion of the frame of the card reader 1, and projections 6 and 7 are respectively provided on both sides of the cutout 5 in the left-right direction. The projection 6 is disposed on the right side of the cutout 5, while the projection 7 is disposed on the left side of the cutout 5. The width of the cutout 5 in the left-right direction is sufficiently wide for a user's finger to enter. As indicated by the two-dot chain line in FIG. 1, the card 2 inwardly inserted in the card reader 1 is partly exposed at the cutout 5.

The card reader 1 includes an IC contact block 8 that has a plurality of IC contact springs to be brought into contact with the external connection terminals of the card 2, a magnetic head 9 that performs at least one of reading magnetic data recorded on the card 2 and recording magnetic data to the card 2, and a lever member 10 that prevents withdrawal of the card 2 inserted in the card reader 1. The card reader 1 also includes an interfering magnetic field generation mechanism 11 that generates a magnetic field for defeating unauthorized reading of magnetic data recorded on the magnetic stripe 2a of the card 2.

The IC contact block 8 is disposed at the inward end portion of the card reader 1. The IC contact block 8 includes an IC contact spring that is arranged so as to face the card movement path 4 from above, and the IC contact block 8 is disposed above the card movement path 4. The magnetic head 9 is disposed in the projection 6. Furthermore, the magnetic head 9 is disposed so as to face the card movement path 4 from below. The magnetic head 9 is disposed at a position through which the magnetic stripe 2a of the card 2 passes in the left-right direction. The lever member 10 is formed in an elongated rod-like shape as a whole, and is disposed at the right end side of the card reader 1 so that the longitudinal direction of the lever member 10 substantially coincide with the front-rear direction.

Configuration of Interfering Magnetic Field Generation Mechanism

Figure 3:
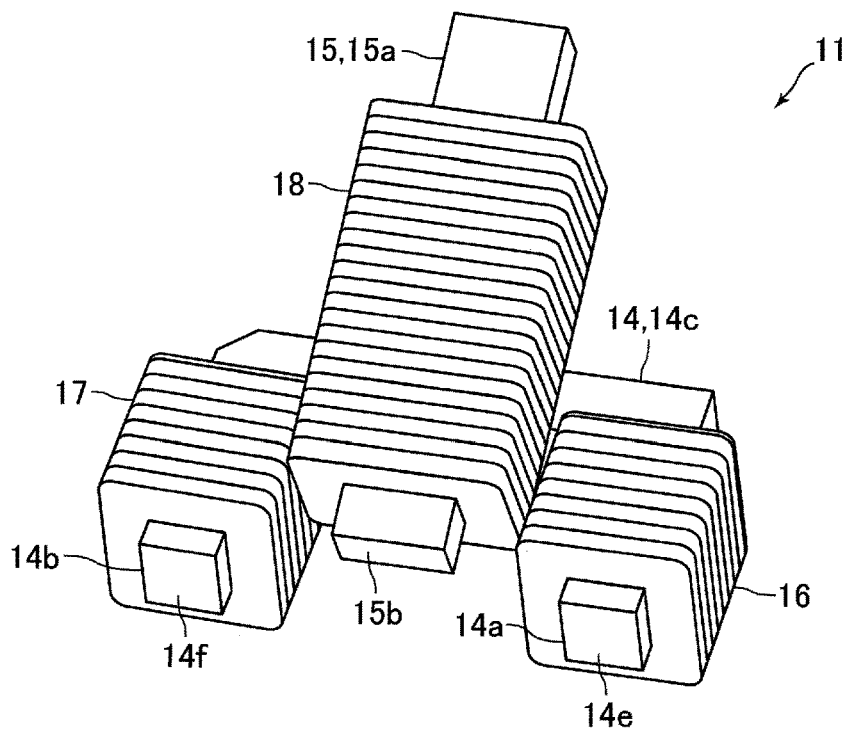
FIG. 3 is a perspective view of the interfering magnetic field generation mechanism illustrated in FIG. 2.
Figure 4:
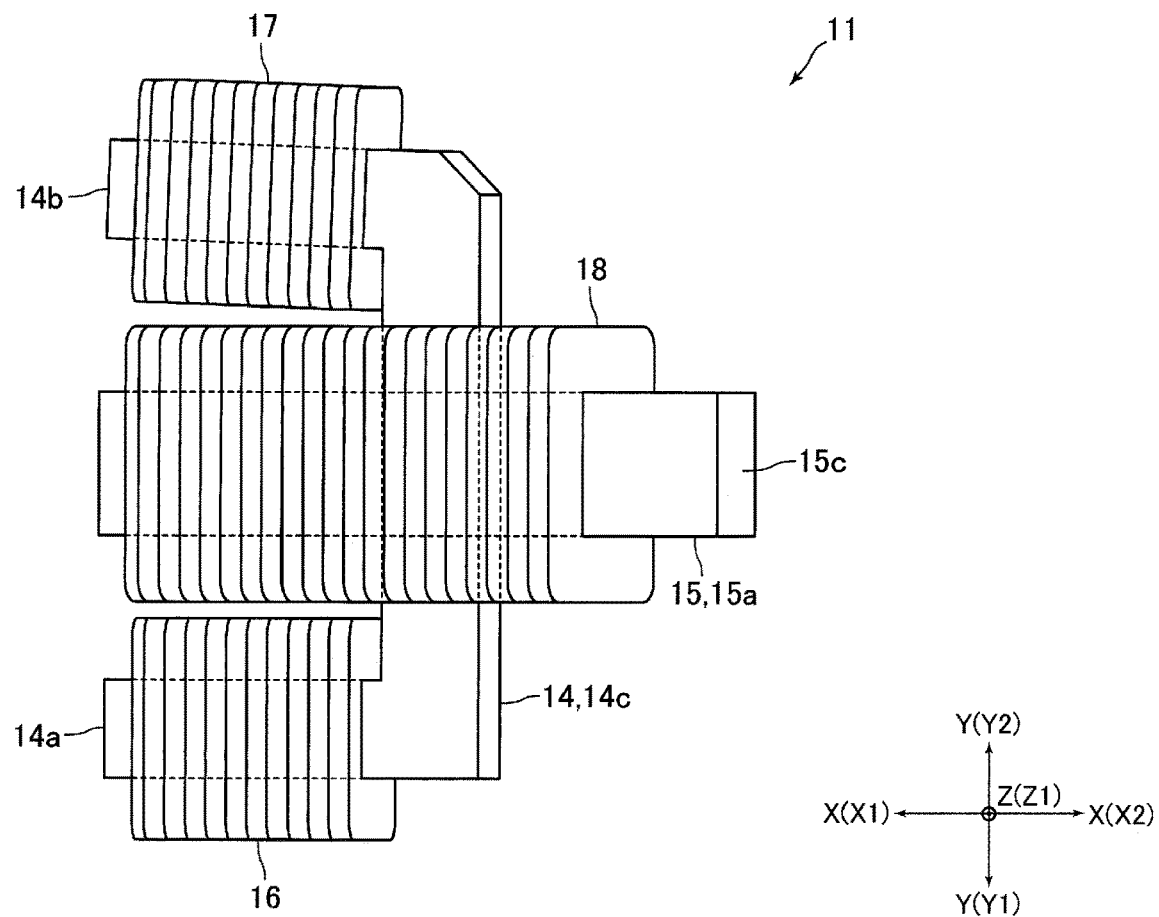
FIG. 4 is a plan view of the interfering magnetic field generation mechanism illustrated in FIG. 2.
Figure 5:
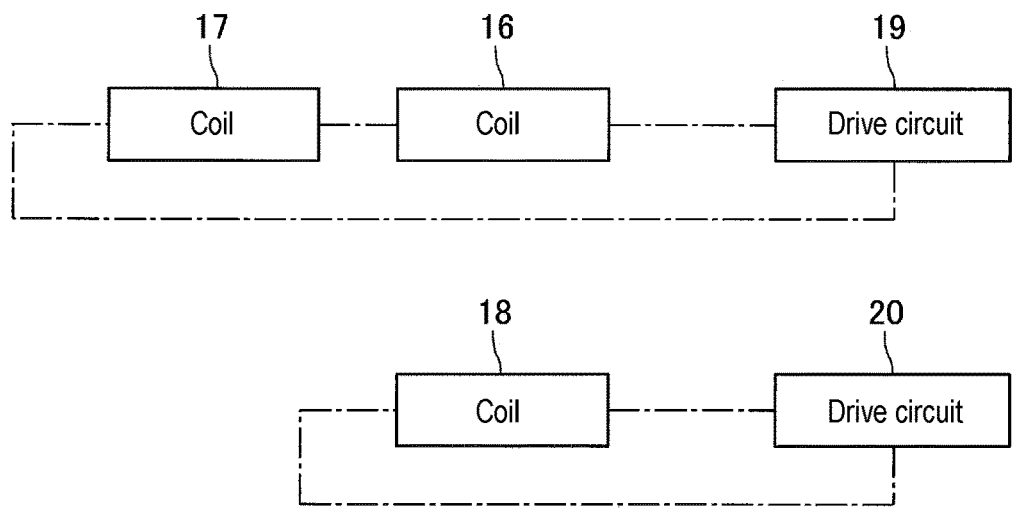
FIG. 5 is a block diagram for explaining the configuration of the interfering magnetic field generation mechanism illustrated in FIG. 2.

FIG. 3 is a perspective view of the interfering magnetic field generation mechanism 11 illustrated in FIG. 2. FIG. 4 is a plan view of the interfering magnetic field generation mechanism 11 illustrated in FIG. 2. FIG. 5 is a block diagram for explaining the configuration of the interfering magnetic field generation mechanism 11 illustrated in FIG. 2.

By way of example, the interfering magnetic field generation mechanism 11 generates an interfering magnetic field when the card 2 is inserted through the card insertion slot 3 and when the card 2 is withdrawn from the card insertion slot 3. The interfering magnetic field generation mechanism 11 includes two cores 14 and 15 formed of soft magnetic material, two excitation coils 16 and 17 wound around the core 14, one excitation coil 18 wound around the core 15, a drive circuit 19 that supplies alternating current to the coils 16 and 17, and a drive circuit 20 that supplies alternating current to the coil 18. The core 14 and the core 15 are formed independently of each other. The drive circuits 19 and 20 are mounted on a circuit board whose illustration is omitted.

The interfering magnetic field generation mechanism 11 is disposed inside a hollow cover member that covers the projection 6. That is, the cores 14 and 15 and the coils 16 to 18 are disposed inside the cover member that cover the projection 6. The cores 14 and 15 and the coils 16 to 18 are disposed above the card movement path 4. Furthermore, the cores 14 and 15 and the coils 16 to 18 are disposed on the front side of the projection 6 or disposed above the front end of the projection 6. The cores 14 and 15 and the coils 16 to 18 are disposed at a position through which the magnetic stripe 2a of the card 2 passes in the left-right direction.

The core 14 includes a core part 14a formed in a straight line, a core part 14b formed in a straight line, and a connecting core part 14c that connects the core part 14a and the core part 14b. The core 14 of the present embodiment is composed of the core parts 14a and 14b and the connecting core part 14c. The core part 14a and 14b is formed in a rod-like shape. Specifically, the core part 14a and 14b is formed in a quadrangular prism shape. The core part 14a and the core part 14b are formed in the same shape, and the length of the core part 14a is equal to the length of the core part 14b. The core part 14a and the core part 14b are arranged in substantially parallel. In other words, the longitudinal direction of the core part 14a is substantially parallel to the longitudinal direction of the core part 14b.

The core part 14a and the core part 14b are spaced apart in the left-right direction. When viewed in the top-bottom direction, the longitudinal directions of the core parts 14a and 14b are substantially parallel to the front-rear direction. The front end of the core part 14a and the front end of the core part 14b are disposed at the same position in the front-rear direction. When viewed in the left-right direction, the core part 14a and the core part 14b completely overlap each other. The connecting core part 14c connects the rear end of the core part 14a and the rear end of the core part 14b. The connecting core part 14c is formed in a rectangular flat plate shape. The longitudinal direction (long side direction) of the connecting core part 14c is parallel to the left-right direction. In other words, the core 14 is formed in a U-shape (the form of a Japanese katakana letter pronounced as "ko").

The coil 16 is wound around the core part 14a, while the coil 17 is wound around the core part 14b. Specifically, the coil 16 is wound around the core part 14a via a bobbin (not illustrated), while the coil 17 is wound around the core part 14b via a bobbin (not illustrated). The coil 16 and the coil 17 are connected in series. The winding direction of the coil 16 and the winding direction of the coil 17 are opposite. When alternating current is supplied to the coils 16 and 17 from the drive circuit 19, an interfering magnetic field (AC magnetic field) is generated in which the direction of the magnetic lines of force fluctuates between a direction from a front end face 14e of the core part 14a to the front end face 14f of the core part 14b and a direction from the front end face 14f to the front end face 14e.

The core 14 of the present embodiment corresponds to the first core. In the present embodiment, the core part 14a corresponds to the first core part, the core part 14b corresponds to the second core part, the coil 16 corresponds to the first coil, the coil 17 corresponds to the second coil, and the drive circuit 19 corresponds to the first drive circuit. Furthermore, in the present embodiment, the front end face 14e of the core part 14a corresponds to the first end face which is one end face of the core part 14a, and a front end face 14f of the core part 14b corresponds to the second end face which is one end face of the core part 14b.

The core 15 includes a core part 15a that is formed in a straight line. The core part 15a is formed in an elongated rectangular flat plate shape. A core 15 of the present embodiment is composed of the core part 15a, and the core 15 is formed in an elongated rectangular plate shape. When viewed in the top-bottom direction, the longitudinal direction (long side direction) of the core part 15a (i.e., core 15) is substantially parallel to the front-rear direction. In other words, when viewed in the top-bottom direction, the longitudinal direction of the core part 15a is substantially parallel to the longitudinal directions of the core parts 14a and 14b.

When viewed in the top-bottom direction, the core part 15a is disposed between the core part 14a and core part 14b. That is, the core part 15a is disposed between the core part 14a and core part 14b in the left-right direction. As described above, the core 14 and the core 15 are formed independently of each other. In other words, the core part 15a is formed independently of the core parts 14a and 14b, and is separated from the core parts 14a and 14b. That is, the core part 15a is not in connection with the core parts 14a and 14b.

The coil 18 is wound around the core part 15a. Specifically, the coil 18 is wound around the core part 15a via a bobbin (not illustrated). The coil 18 is disposed between the coil 16 and the coil 17 in the left-right direction. When alternating current is supplied to the coil 18 from the drive circuit 20, an interfering magnetic field (AC magnetic field) is generated in which the direction of the magnetic lines of force fluctuates between a direction toward a front end face 15b of the core part 15a and a direction toward the rear end face 15c of the core part 15a. In the present embodiment, alternating current supplied to the coils 16 and 17 and alternating current supplied to the coil 18 are different in frequency and amplitude. In the present embodiment, the core 15 corresponds to the second core, the core part 15a corresponds to the third core part, the coil 18 corresponds to the third coil, and the drive circuit 20 corresponds to the second drive circuit.

As illustrate in FIG. 2, the cores 14 and 15 are inclined with respect to the front-rear direction when viewed in the left-right direction. In other words, the core parts 14a, 14b, and 15a are inclined with respect to the front-rear direction when viewed in the left-right direction. Specifically, when viewed in the left-right direction, the core parts 14a, 14b, and 15a are inclined upward to the rear side. When viewed in the left-right direction, the inclination angle θ1 of the core part 15a with respect to the front-rear direction is different from the inclination angle θ2 of the core parts 14a and 14b with respect to the front-rear direction. In the present embodiment, the inclination angle θ1 of the core part 15a is greater than the inclination angle θ2 of the core parts 14a and 14b. By way of example, the inclination angle θ1 is about 22° and the inclination angle θ2 is about 2°.

The core part 15a is different from the core parts 14a and 14b in length. In the present embodiment, the core part 15a is greater than the core parts 14a and 14b in length. By way of example, the length of the core part 15a is about twice the length of the core parts 14a and 14b. The front end of the core part 15a and the front ends of the core parts 14a and 14b are disposed at substantially the same position in the front-rear direction. The rear end of the core part 15a is located further rear side than the rear ends of the core parts 14a and 14b. The inclination angle θ1 of the core part 15a and the inclination angle θ2 of the core parts 14a and 14b are set so that the core part 15a disposed between the core parts 14a and 14b in the left-right direction does not interfere with the connecting core part 14c.

Main Advantages of Present Embodiment

As described above, in the present embodiment, the interfering magnetic field generation mechanism 11 includes the drive circuit 19 that supplies alternating current to the coils 16 and 17 and the drive circuit 20 that supplies alternating current to the coil 18, in which the alternating current supplied to the coils 16 and 17 and the alternating current supplied to the coil 18 are different in frequency and amplitude. Therefore, according to the present embodiment, it becomes possible for the interfering magnetic field generation mechanism 11 to generate a complex interfering magnetic field.

In the present embodiment, the core part 15a is formed independently of the core parts 14a and 14b, and is not in connection with the core parts 14a and 14b. Therefore, according to the present embodiment, a magnetic path is less likely to be formed between the core parts 14a and 14b and the core part 15a. Consequently, according to the present embodiment, the magnetic flux that enters the core part 14a or the core part 14b from the core part 15a disposed between the core part 14a and the core part 14b and the magnetic flux that enters the core part 15a from the core part 14a or the core part 14b are less likely to be generated. As a result, according to the present embodiment, it becomes possible to expand the influence range of the interfering magnetic field generated by the interfering magnetic field generation mechanism 11. For example, the magnetic flux that enters the front end face 14e of the core part 14a or the front end face 14f of the core part 14b from the front end face 15b of the core part 15a is less likely to be generated, so that it becomes possible to expand the influence range of the interfering magnetic field generated by the interfering magnetic field generation mechanism 11 to a farther position in the front of the card reader 1.

Furthermore, in the present embodiment, the core part 15a is different from the core parts 14a and 14b in length, and the inclination angle θ1 of the core part 15a with respect to the front-rear direction is different from the inclination angle θ2 of the core parts 14a and 14b with respect to the front-rear direction when viewed from the left-right direction. Therefore, according to the present embodiment, it becomes possible to place the rear end of the core part 15a farther from the rear end of the core 14. Consequently, according to the present embodiment, the magnetic flux that enters the core 14 from the core part 15a and the magnetic flux that enters the core part 15a from the core 14 is less likely to be generated, on the rear end side of the core part 15a. Consequently, according to the present embodiment, it becomes possible to further expand the influence range of the interfering magnetic field generated by the interfering magnetic field generation mechanism 11.

In the present embodiment, when viewed in the top-bottom direction, the longitudinal directions of the core parts 14a, 14b, and 15a, each of which is formed in a straight line, is substantially parallel to the front-rear direction. Therefore, according to the present embodiment, it becomes possible to expand the influence range of the interfering magnetic field generated by the interfering magnetic field generation mechanism 11 to a farther position in front of the card reader 1, compared with the case in which the longitudinal directions of the core parts 14a, 14b, and 15a are inclined with respect to the front-rear direction when viewed from the top-bottom direction.

In the present embodiment, the core part 14a and the core part 14b are connected by the connecting core part 14c. Therefore, according to the present embodiment, it becomes possible to suppress magnetic flux leakage between the core part 14a and the core part 14b. Consequently, according to the present embodiment, it becomes possible to increase the intensity of the interfering magnetic field generated by the core parts 14a and 14b. Furthermore, according to the present embodiment, the length of the core part 15a is made longer than the length of the core parts 14a and 14b, so that it becomes possible to increase the number of turns in the coil 18 wound around the core part 15a. Consequently, according to the present embodiment, it becomes possible to increase the intensity of the interfering magnetic field generated by the core part 15a.

Modifications of Core

Figure 6:
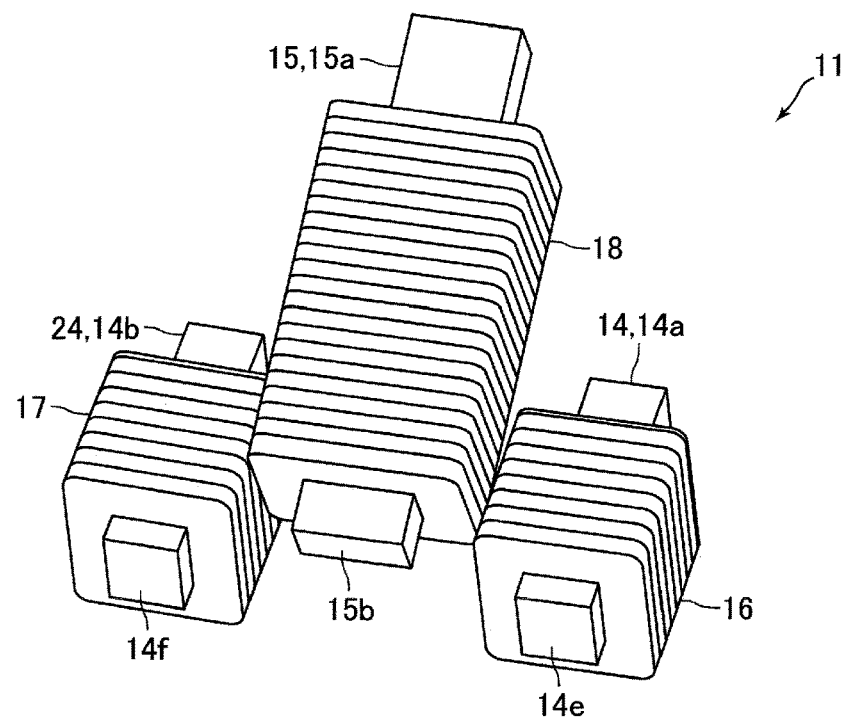
FIG. 6 is a perspective view of an interfering magnetic field generation mechanism according to another embodiment of the present disclosure.
Figure 7:
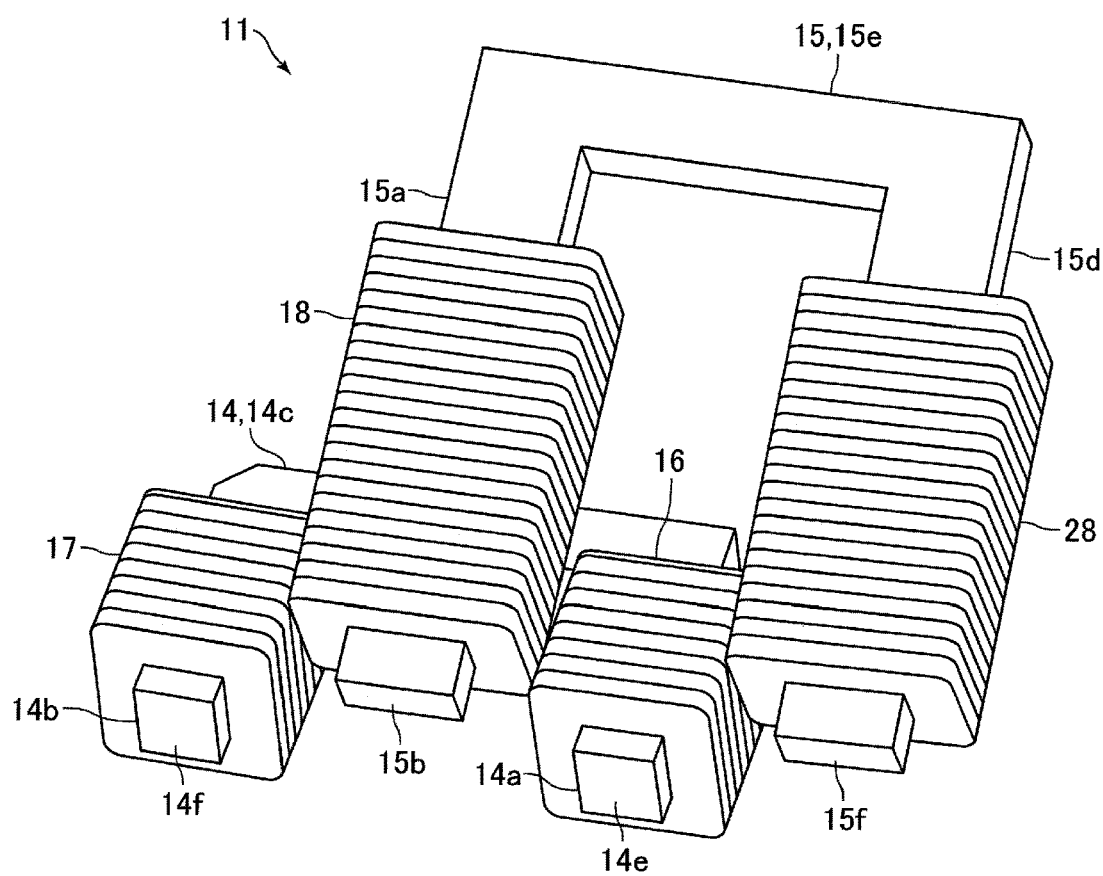
FIG. 7 is a perspective view of an interfering magnetic field generation mechanism according to another embodiment of the present disclosure.

FIG. 6 and FIG. 7 are perspective views of interfering magnetic field generation mechanisms 11 according to other embodiments of the present disclosure.

In the embodiment described above, the core part 14a and the core part 14b do not have to be connected by the connecting core part 14c, as illustrated in FIG. 6. In this case, the interfering magnetic field generation mechanism 11 includes the core 14 composed of the core part 14a, a core 24 composed of the core part 14b, and the core 15 composed of the core part 15a, and the core 14, the core 24, and the core 15 are formed independently of one another. In this case, the core 14 corresponds to the first core, the core 24 corresponds to the second core, and the core 15 corresponds to the third core. In FIG. 6, the same reference symbols are used to denote the components similar to those of the embodiment described above.

Furthermore, in the embodiment described above, the core 15 may include a core part 15d that is formed to have the same shape as of the core part 15a and that is disposed parallel to the core part 15a, and a connecting core part 15e that connects the rear end of the core part 15a and the rear end of the core part 15d, as illustrated in FIG. 7. In this case, the core part 14a is disposed between the core part 15a and the core part 15d in the left-right direction. Furthermore, a coil 28 is wound around the core part 15d. The coil 18 and the coil 28 are connected in series.

The winding direction of the coil 18 and the winding direction of the coil 28 are opposite. The drive circuit 20 supplies alternating current to the coils 18 and 28. When alternating current is supplied to the coils 18 and 28 from the drive circuit 20, an interfering magnetic field (AC magnetic field) is generated in which the direction of the magnetic lines of force fluctuates between a direction from the front end face 15b of the core part 15a to a front end face 15f of the core part 15d and a direction from the front end face 15f to the front end face 15b. In FIG. 7, the same reference symbols are used to denote the components similar to those of the embodiment described above.

Other Embodiments

The embodiment described above is some examples of a preferred embodiment of the present disclosure. However, the embodiment is not limited thereto, and various modifications may be implemented to the extent that the gist of the present invention is not changed.

In the embodiment described above, the front ends of the core parts 14a and 14b and the front end of the core part 15a may be offset in the front-rear direction. Furthermore, in the embodiment described above, the front end of the core part 14a and the front end of the core part 14b may be offset in the front-rear direction. The core part 14a and the core part 14b do not have to be formed in the same shape.

In the embodiment described above, the core part 15a may be greater than the core parts 14a and 14b in length. Even in this case, it becomes possible to place the rear end of the core part 15a farther from the rear end of the core 14. Furthermore, in the embodiment described above, the core part 15a may be equal to the core parts 14a and 14b in length.

In the embodiment described above, the core parts 14a and 14b may be parallel to the front-rear direction when viewed from the left-right direction. Furthermore, in the embodiment described above, the inclination angle θ2 of the core parts 14a and 14b may be greater than the inclination angle θ1 of the core part 15a. Furthermore, the inclination angle θ1 may be equal to the inclination angle θ2. When the inclination angle θ1 is equal to the inclination angle θ2, the core part 15a is less than the core parts 14a and 14b in length. However, in the modification illustrated in FIG. 6, when the inclination angle θ1 is equal to the inclination angle θ2, the core part 15a may be greater than the core parts 14a and 14b in length.

In the embodiment described above, the longitudinal directions of the core parts 14a, 14b, and 15a may be inclined with respect to the front-rear direction when viewed from the top-bottom direction. In the embodiment described above, the interfering magnetic field generation mechanism 11 may be disposed below the card movement path 4. In the embodiment described above, the card reader 1 is a manual card reader, but the card reader to which the features of the present disclosure is applied may be a card conveyance type card reader having a conveyance mechanism for the card 2.

The invention claimed is:
1. A card reader comprising:
a card insertion slot through which a card having a magnetic stripe is inserted;
a card movement path along which the card inserted through the card insertion slot moves; and
an interfering magnetic field generation mechanism that generates a magnetic field for defeating unauthorized reading of magnetic data recorded on the magnetic stripe,
wherein
the interfering magnetic field generation mechanism comprises: a first core part, a second core part, and a third core part, each of which is formed of soft magnetic material in a straight line; a first coil that is a coil wound around the first core part; a second coil that is a coil wound around the second core part and being connected with the first coil in series; a third coil that is a coil wound around the third core part; a first drive circuit that supplies alternating current to the first coil and the second coil; and a second drive circuit that supplies alternating current to the third coil,
the first core part, the second core part, and the third core part are disposed on one side relative to the card movement path in a thickness direction of the card that moves along the card movement path,
the third core part is disposed between the first core part and the second core part, when viewed in the thickness direction of the card,
when alternating current is supplied to the first coil and the second coil, an AC magnetic field is generated in which a direction of magnetic lines of force fluctuates between: a direction from a first end face that is one end face of the first core part to a second end face that is one end face of the second core part; and a direction from the second end face to the first end face, and
the third core part is formed independently of the first core part and the second core part, and is separated from the first core part and the second core part.
2. The card reader according to claim 1, wherein
the interfering magnetic field generation mechanism comprises: a first core having a connecting core part that connects the first core part and the second core part, the first core part, and the second core part; and a second core having the third core part, and the first core and the second core are formed independently of one another.

3. The card reader according to claim 2, wherein taking a direction orthogonal to a movement direction of the card that moves along the card movement path and to the thickness direction of the card to be a width direction of the card, a longitudinal direction of the first core part formed in a straight line, a longitudinal direction of the second core part formed in a straight line, and a longitudinal direction of the third core part formed in a straight line are substantially parallel to the movement direction of the card, when viewed in the thickness direction of the card, and the third core part is disposed between the first core part and the second core part in the width direction of the card.

4. The card reader according to claim 3, wherein the third core part is different from the first core part and the second core part in length.

5. The card reader according to claim 4, wherein the third core part is greater than the first core part and the second core part in length.

6. The card reader according to claim 5, wherein taking a direction orthogonal to a movement direction of the card that moves along the card movement path and to the thickness direction of the card to be a width direction of the card, an inclination angle of the third core part with respect to the movement direction of the card is different from an inclination angle of the first core part and an inclination angle of the second core part with respect to the movement direction of the card, when viewed in the width direction of the card.

7. The card reader according to claim 6, wherein the inclination angle of the third core part with respect to the movement direction of the card is greater than the inclination angle of the first core part and the inclination angle of the second core part with respect to the movement direction of the card, when viewed in the width direction of the card.

8. The card reader according to claim 1, wherein
the interfering magnetic field generation mechanism includes: a first core having the first core part, a second core having the second core part; and a third core having the third core part, and the first core, the second core, and the third core are formed independently of one another.

9. The card reader according to claim 1, wherein taking a direction orthogonal to a movement direction of the card that moves along the card movement path and to the thickness direction of the card to be a width direction of the card, a longitudinal direction of the first core part formed in a straight line, a longitudinal direction of the second core part formed in a straight line, and a longitudinal direction of the third core part formed in a straight line are substantially parallel to the movement direction of the card, when viewed in the thickness direction of the card, and the third core part is disposed between the first core part and the second core part in the width direction of the card.

10. The card reader according to claim 1, wherein the third core part is different from the first core part and the second core part in length.

11. The card reader according to claim 10, wherein the third core part is greater than the first core part and the second core part in length.

12. The card reader according to claim 1, wherein taking a direction orthogonal to a movement direction of the card that moves along the card movement path and to the thickness direction of the card to be a width direction of the card, an inclination angle of the third core part with respect to the movement direction of the card is different from an inclination angle of the first core part and an inclination angle of the second core part with respect to the movement direction of the card, when viewed in the width direction of the card.

13. The card reader according to claim 12, wherein the inclination angle of the third core part with respect to the movement direction of the card is greater than the inclination angle of the first core part and the inclination angle of the second core part with respect to the movement direction of the card, when viewed in the width direction of the card.

* * * * *